N. W. AKIMOFF.
SHAFT SUPPORT FOR TESTING PURPOSES.
APPLICATION FILED JUNE 4, 1917.
1,365,440.
Patented Jan. 11, 1921.
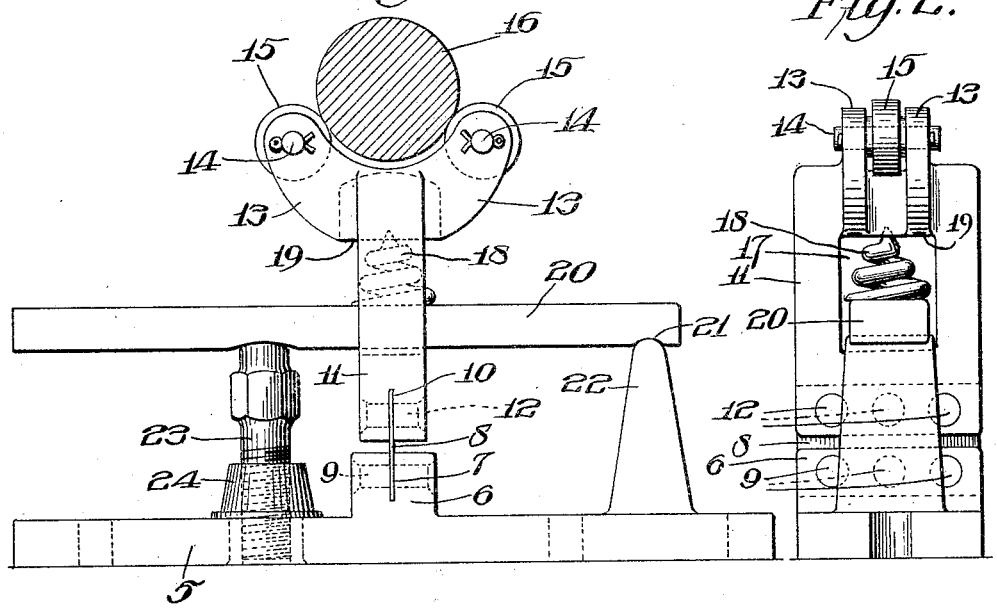
Inventor
Nicholas W. Akimoff.
By Jas. C. Wobensmith
Attorney

UNITED STATES PATENT OFFICE.

NICHOLAS W. AKIMOFF, OF PHILADELPHIA, PENNSYLVANIA, ASSIGNOR TO VIBRATION SPECIALTY COMPANY, A CORPORATION OF DELAWARE.

SHAFT-SUPPORT FOR TESTING PURPOSES.

1,365,440.  Specification of Letters Patent.  Patented Jan. 11, 1921.

Application filed June 4, 1917. Serial No. 172,761.

*To all whom it may concern:*

Be it known that I, NICHOLAS W. AKIMOFF, a citizen of the United States, residing at Philadelphia, in the county of Philadelphia and State of Pennsylvania, have invented certain new and useful Improvements in Shaft-Supports for Testing Purposes, of which the following is a specification.

My invention relates to a shaft support for testing purposes, that is to say, to a device for supporting or journaling one end of a shaft of a rotatable body while the same is being tested for chatter due to improper distribution of the mass thereof. The principal object of my invention is to provide a shaft support or journaling device which is so constructed and arranged that the chatter of rotatable body under test not only will not be dampened, but on the contrary, will be made more perceptible by making the period of free oscillation of the support synchronize with the rate of rotation of the body.

My invention stated in general terms contemplates the provision of a shaft support adapted to oscillate, without damping, transversely to the initial axis of the shaft and having means whereby the periodicity of pendular oscillation of the support may be adjusted to bring the same into resonance or synchronism with the rate of rotation of the body while the same is being tested, and, in this manner, considerably increasing the amplitude of vibration so that the same may be more readily observed.

The nature and characteristic features of my invention will be more readily understood from the following description taken in connection with the accompanying drawings forming part hereof in which—

Figure 1 is a side elevation of a shaft support embodying the main features of my invention and;

Fig. 2 is an end elevation thereof.

Referring to the drawings, in the particular embodiment of my invention there shown, 5 is a base plate adapted to be bolted or otherwise secured to the ways of a lathe or other device for rotating the shaft of the body to be tested for chatter due to improper distribution of the mass thereof. The base plate 5 is provided with an upwardly extending centrally disposed lug or projection 6 which is slotted as at 7, in which slot a plate spring 8 is snugly fitted and projects upward therefrom. Rivets 9 extend through the lug 6 and spring 8 to insure the rigid attachment of the spring 8.

The upper end of the plate spring 8 is also snugly fitted in a slot 10 in the lower end of a frame or yoke 11, being rigidly secured therein by means of the rivets 12. The upper end of the frame or yoke 11 is provided with extending arms 13 forming brackets for supporting studs or spindles 14 upon which are mounted stock type ball or roller bearings 15. The bearings 15 support the shaft 16 which is the shaft of the rotatable body to be tested or examined. It will be noted that by means of the above described structure the shaft 16 will be supported against vertical movement, but will be free to oscillate or vibrate laterally without damping, on account of the interposition of the plate spring 8 in the apparatus. The frame or yoke 11 and its associated parts as so far described would however have a fixed rate or periodicity of free pendular oscillation which of course would not at all times harmonize with vibration of the body under examination, and in order to synchronize the same the hereinafter described parts are provided.

In the form or embodiment of the invention shown in the drawings the frame or yoke 11 is provided with a central opening 17 within which is disposed a coil compression spring 18, one end of which is seated against an interior surface 19 of the frame 11 and the other end of which is seated against one face of lever 20. One end of the lever 20 is pivotally supported as at 21 on a projection 22 which extends upward from the base plate 5, and the other end of the lever 20 is adjustably supported by means of a stud 23 which is threaded in a bushing 24 mounted in the base plate 5. By this arrangement the degree of compression of the spring 18 may be varied at will, during the rotation of the shaft 16, to thereby adjust the periodicity of free lateral oscillation of the upper end of the frame 11 and its associated parts to bring the same in resonance or synchronism with the vibration of the body under examination for the purpose hereinbefore set forth.

It will be noted that there is thus provided a means for supporting a shaft against vertical movement but which permits free lateral oscillation or vibration and which permits the ready adjustment of the pendular periodicity of the supporting element during the test, while the body under examination is rotating, whereby the amplitude of the vibration will be considerably increased so as to be more readily observed. Furthermore it will be noted that there will be no tendency to dampen the vibration as would occur if friction producing pivot devices were employed to mount the supporting element instead of the spring plate member 8.

Having thus described my invention, what I claim as new and desire to secure by Letters Patent is:—

1. A shaft support for testing purposes comprising a base plate, a plate spring having one end fixedly mounted therein, an oscillatory frame or yoke secured to the other end of said plate spring, means carried at the free end of said frame or yoke for supporting a rotatable shaft, and a coil spring extending transverse to the direction of oscillation of said frame or yoke having one end bearing against a portion of said frame or yoke.

2. A shaft support for testing purposes comprising a base plate, a plate spring having one end fixedly mounted therein, an oscillatory frame or yoke secured to the other end of said plate spring, means carried at the free end of said frame or yoke for supporting a rotatable shaft, a coil spring extending transverse to the direction of oscillation of said frame or yoke having one end bearing against a portion of said frame or yoke, and means for adjusting the tension of said spring.

3. A shaft support for testing purposes comprising a base plate, a plate spring having one end fixedly mounted therein, an oscillatory frame or yoke secured to the other end of said plate spring, means carried at the free end of said frame or yoke for supporting a rotatable shaft, a coil spring extending transverse to the direction of oscillation of said frame or yoke having one end bearing against a portion of said frame or yoke, and an adjustable lever against which the other end of said spring bears.

4. A shaft support for testing purposes comprising a base plate, a plate spring having one end fixedly mounted therein, an oscillatory frame or yoke secured to the other end of said plate spring and extending upwardly therefrom, means carried at the free end of said frame or yoke for supporting a rotatable shaft, a coil spring extending transverse to the direction of oscillation of said frame or yoke having one end bearing against a portion of said frame or yoke, and a lever against which the other end of said spring bears.

5. A shaft support for testing purposes comprising a base plate, a plate spring having one end fixedly mounted therein, an oscillatory frame or yoke secured to the other end of said plate spring and extending upwardly therefrom, means carried at the free end of said frame or yoke for supporting a rotatable shaft, a coil spring extending transverse to the direction of oscillation of said frame or yoke having one end bearing against a portion of said frame or yoke, a lever against which the other end of said spring bears, and means for adjusting the position of said lever to vary the tension of said spring.

In testimony whereof I have hereunto signed my name.

NICHOLAS W. AKIMOFF.